US010069376B2

(12) United States Patent
Chiou

(10) Patent No.: US 10,069,376 B2
(45) Date of Patent: Sep. 4, 2018

(54) CEILING FAN MOTOR

(71) Applicant: Sunonwealth Electric Machine Industry Co., Ltd., Kaohsiung (TW)

(72) Inventor: Bo-Wei Chiou, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 292 days.

(21) Appl. No.: 14/972,673

(22) Filed: Dec. 17, 2015

(65) Prior Publication Data

US 2016/0197531 A1 Jul. 7, 2016

(30) Foreign Application Priority Data

Jan. 7, 2015 (TW) .............................. 104100412 A

(51) Int. Cl.
| | |
|---|---|
| *H02K 5/22* | (2006.01) |
| *H02K 7/14* | (2006.01) |
| *H02K 11/33* | (2016.01) |
| *H02K 11/00* | (2016.01) |
| *H02K 21/22* | (2006.01) |

(52) U.S. Cl.
CPC ............... *H02K 5/225* (2013.01); *H02K 7/14* (2013.01); *H02K 11/00* (2013.01); *H02K 11/0094* (2013.01); *H02K 11/33* (2016.01); *H02K 21/22* (2013.01)

(58) Field of Classification Search
CPC ............ H02K 5/225; H02K 5/22; H02K 7/14; H02K 11/33; H02K 11/00; H02K 11/0094; H02K 21/22
USPC ......................................................... 310/71
See application file for complete search history.

(56) References Cited

U.S. PATENT DOCUMENTS

| | | | | |
|---|---|---|---|---|
| 4,073,598 | A * | 2/1978 | Mizutani | F04D 25/0613 416/170 R |
| 4,935,653 | A * | 6/1990 | Cheng | H02K 1/165 310/184 |
| 5,586,867 | A * | 12/1996 | Mehlos | F04D 25/088 416/170 R |

(Continued)

FOREIGN PATENT DOCUMENTS

| | | |
|---|---|---|
| CN | 203707931 U | 7/2014 |
| CN | 203774937 U | 8/2014 |

(Continued)

*Primary Examiner* — Naishadh Desai
(74) *Attorney, Agent, or Firm* — Alan D. Kamrath; Kamrath IP Lawfirm, P.A.

(57) ABSTRACT

A ceiling fan motor includes a stator, a rotor and a circuit box. The stator includes a shaft and an iron core. The rotor is rotatably coupled with the shaft. The circuit box is adapted to be attached to or detached from the stator and includes a circuit board, an opening and a shaft hole. The circuit board is electrically connected to an electrical connection portion. The opening extends through one surface to another surface of the circuit box. The electrical connection portion is adapted to be connected to an external accessory or a wire via the opening, and the shaft extends through the shaft hole. In another embodiment, the circuit box includes a plurality of openings and is electrically connected to a plurality of electrical connection portions. The quantity of the plurality of openings corresponds to the quantity of the plurality of electrical connection portions.

22 Claims, 10 Drawing Sheets

(56) References Cited

U.S. PATENT DOCUMENTS

| | | | |
|---|---|---|---|
| 6,017,190 A * | 1/2000 | Lackey | F04D 25/088 416/244 R |
| 6,028,386 A | 2/2000 | Kech et al. | |
| 6,118,198 A | 9/2000 | Hollenbeck et al. | |
| 6,203,293 B1 | 3/2001 | Yamamoto et al. | |
| 7,638,911 B2 | 12/2009 | Lee | |
| 9,410,442 B2 | 8/2016 | Clothier et al. | |
| 2004/0104628 A1 * | 6/2004 | Streng | F04D 29/668 310/51 |
| 2004/0189113 A1 * | 9/2004 | Kuribara | F16C 17/08 310/67 R |
| 2007/0001529 A1 | 1/2007 | Takahashi et al. | |
| 2007/0222305 A1 * | 9/2007 | Takada | H02K 1/2786 310/43 |
| 2009/0208333 A1 * | 8/2009 | Smith | F04D 25/088 416/5 |
| 2012/0194112 A1 | 8/2012 | Purohit | |
| 2013/0300264 A1 * | 11/2013 | Fujimoto | B62D 5/0406 310/68 D |
| 2015/0171696 A1 * | 6/2015 | Zhang | H02K 5/163 310/68 B |
| 2015/0176602 A1 | 6/2015 | Horng | |
| 2015/0180290 A1 | 6/2015 | Yin et al. | |
| 2015/0214865 A1 * | 7/2015 | Zhao | F24F 11/0009 700/276 |
| 2015/0333592 A1 | 11/2015 | Yin et al. | |
| 2016/0020657 A1 | 1/2016 | Hattori et al. | |
| 2016/0111940 A1 * | 4/2016 | Oyama | F04D 25/068 417/423.7 |
| 2016/0238031 A1 | 8/2016 | Clothier et al. | |

FOREIGN PATENT DOCUMENTS

| | | |
|---|---|---|
| CN | 203939762 U | 11/2014 |
| DE | 19824342 A1 | 2/1999 |
| DE | 10113559 A1 | 9/2001 |
| EP | 0860930 A2 | 8/1998 |
| EP | 1737109 A1 | 12/2006 |
| GB | 2493976 A | 2/2013 |
| TW | M354002 U | 4/2009 |
| WO | WO2008069361 A2 | 6/2008 |
| WO | WO2011065394 A1 | 6/2011 |
| WO | WO2014174996 A1 | 10/2014 |

* cited by examiner

CEILING FAN MOTOR

CROSS REFERENCE TO RELATED APPLICATIONS

The application claims the benefit of Taiwan application serial No. 104100412, filed on Jan. 7, 2015, and the subject matter of which is incorporated herein by reference.

BACKGROUND OF THE INVENTION

1. Field of the Invention

The present invention generally relates to a ceiling fan motor and, more particularly, to a ceiling fan motor having an electrical connection portion for connection with a lead wire.

2. Description of the Related Art

FIG. 1 shows a conventional ceiling fan motor 8 including a stator 81, a rotor 82 and a control unit 83. The stator 81 includes a shaft 811, an iron core 812 fitted around the shaft 811, and a coil 813 wound around the iron core 812. The rotor 82 is rotatably fitted around the shaft 811 and includes a first cover 821, a second cover 822, and a sleeve 823 arranged between the first cover 821 and the second cover 822. The first cover 821 and the second cover 822 are arranged at two ends of the iron core 812. The control unit 83 includes a circuit board 831 and a housing 832 receiving the circuit board 831. The housing 832 is coupled with the shaft 811. Such a conventional ceiling fan motor can be seen in Taiwan Patent No. M354002.

The circuit board 831 is mounted with a variety of electric components. Thus, the circuit board 831 could be damaged after a long term of use. The housing 832 is coupled with the shaft 811 that is mounted to the ceiling. Thus, when it is desired to replace or maintain the circuit board 831, one needs to remove the shaft 811 from the ceiling and then detach the housing 832 from the motor 8. Thus, maintenance of the circuit board 831 is inconvenient.

FIGS. 2 and 3 show another convention ceiling fan motor 9. The motor 9 includes a stator 91, a rotor 92 and a circuit box 93. The stator 91 includes a shaft 911 and an iron core 912 coupled with the shaft 911. The circuit box 93 is coupled with the stator 91. The rotor 92 is rotatably coupled with the shaft 911. The circuit box 93 includes a circuit board 931 for controlling the operation of the motor 9. In order to provide convenient maintenance of the circuit board 831 of the circuit box 83, the circuit box 93 includes an assembly channel 932 extending in a radial direction perpendicular to the shaft 911. As such, the circuit box 93 appears to be in the form of a C-shaped chunk. The shaft 911 may extend through the assembly channel 932, and the circuit box 93 can be attached to or detached from the stator 91. In this arrangement, the circuit board 931 may be mounted in the circuit box 93 as an integrated module. Thus, when the circuit board 931 is worn out, the maintainer is able to separate the circuit box 93 from the stator 91 and pull out the circuit box 93 from the motor 9 along the assembly channel 932 for replacement or maintenance. Such a motor can be seen in China Patent No. 203774937U.

The shaft 911 is hollow, and a lead wire (such as a power cord) is received in the shaft 911. The lead wire extends out of the shaft 911 through a hole 911a for electrical connection with the circuit board 931 of the circuit box 93. Since the circuit board 931 is electrically connected to the lead wire in the shaft 911, after the circuit box 93 is separated from the stator 91, the maintainer needs to stretch his/her fingers into the circuit box 93 and disengage the lead wire from the circuit board 931 by fingers or by a tool in order to detach the circuit box 93 from the motor 9 via the assembly channel 932. However, the gap between the circuit box 93 and the stator 91 is too small, and the circuit box 93 may be located between the ceiling and the stator 91. Thus, it can be difficult to disengage the lead wire from the circuit board 931 of the circuit box 93. Therefore, the maintenance of the motor 9 is still difficult. Unlike the previous fan motor 8 where the circuit board 831 can be repaired or replaced only when the entire fan motor 8 is detached from the ceiling, the circuit board 931 of the circuit box 93 can be repaired or replaced without having the entire ceiling fan motor 9 removed from the ceiling. However, it is somewhat inconvenient to repair or maintain the circuit board 931 of the circuit box 93.

From the above, it is inconvenient to repair both kinds of fan motors 8, 9. Thus, it is necessary to provide a ceiling fan motor that can be repaired or maintained easily.

SUMMARY OF THE INVENTION

It is therefore the objective of this invention to provide a ceiling fan motor having a circuit box. The circuit box includes a circuit board electrically connected to an electrical connection portion in which a maintainer is able to connect a lead wire to the electrical connection portion without having to stretch his/her fingers into the circuit box. This improves utility of the ceiling fan motor.

In an embodiment, a ceiling fan motor includes a stator, a rotor and a circuit box. The stator includes a shaft and an iron core. The rotor is rotatably coupled with the shaft. The circuit box is adapted to be attached to or detached from the stator and includes a circuit board, an opening and a shaft hole. The circuit board is electrically connected to an electrical connection portion. The opening extends through one surface to another surface of the circuit box. The electrical connection portion is adapted to be connected to an external accessory or a wire via the opening, and the shaft extends through the shaft hole.

In a preferred form shown, the electrical connection portion is an electrical socket or an electrical plug.

In the preferred form shown, the electrical connection portion is fixed on the circuit board via a connection member.

In the preferred form shown, the electrical connection portion is connected to one end of a connection wire, and another end of the connection wire is fixed to the circuit board by soldering.

In the preferred form shown, the electrical connection portion is aligned with the opening.

In the preferred form shown, the electrical connection portion extends out of the circuit box through the opening.

In the preferred form shown, the connection wire extends through the opening and is connected to the electrical connection portion, such that the electrical connection portion is located outside of the circuit box.

In the preferred form shown, the circuit box further includes an assembly channel extending in a radial direction perpendicular to the shaft, and the shaft is capable of extending through the assembly channel.

In the preferred form shown, the electrical connection portion is in the form of a wire unit having an end, and the wire unit extends through the opening so that the end of the wire unit is located outside of the circuit box.

In another embodiment, a ceiling fan motor includes a stator, a rotor and a circuit box. The stator includes a shaft and an iron core. The rotor is rotatably coupled with the shaft. The circuit box is adapted to be attached to or detached from the stator and includes a circuit board, a plurality of openings and a shaft hole. The circuit board is electrically connected to a plurality of electrical connection portions. At least one of the plurality of openings extends through one surface to another surface of the circuit box. The plurality of electrical connection portions is adapted to be connected to an external accessory or a wire via the opening. The quantity of the plurality of openings corresponds to the quantity of the plurality of electrical connection portions.

In a form shown, each electrical connection portion is adapted to be connected to the external accessory or the wire via a respective one of the plurality of openings.

In the form shown, the shaft is hollow and receives a lead wire. The lead wire extends out of the shaft through a hole formed on a surface of the shaft and electrically connects to one of the plurality of electrical connection portions in the exterior of the circuit box.

In the form shown, the lead wire is electrically connected to an external power.

In the form shown, the iron core is wound with a coil unit, and the coil unit is connected to another one of the plurality of electrical connection portions via another lead wire in the exterior of the circuit box.

In the form shown, the circuit board is mounted with a plurality of electronic components, and the electrical connection portion is electrically connected one of the plurality of electronic components.

In the form shown, the circuit box includes a first face, a second face, and a longitudinally extending face connected between the first face and the second face. The first face has a different height than the second face along an extending direction of the shaft, and the opening is arranged on the longitudinally extending face.

Based on the above, the electrical connection portion may be aligned with the opening so that the electrical connection portion is adapted to be connected to the external accessory or the wire via the opening. In this arrangement, connection between the electrical connection portion and the lead wire may be carried out in the exterior of the circuit box. Therefore, when the circuit board malfunctions, the maintainer is able to detach the lead wire from the electrical connection portion in the exterior of the circuit box and pull the circuit box off the ceiling fan motor along the assembly channel for repair or replacement purposes. Advantageously, convenient assembly and maintenance of the ceiling fan motor is attained.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
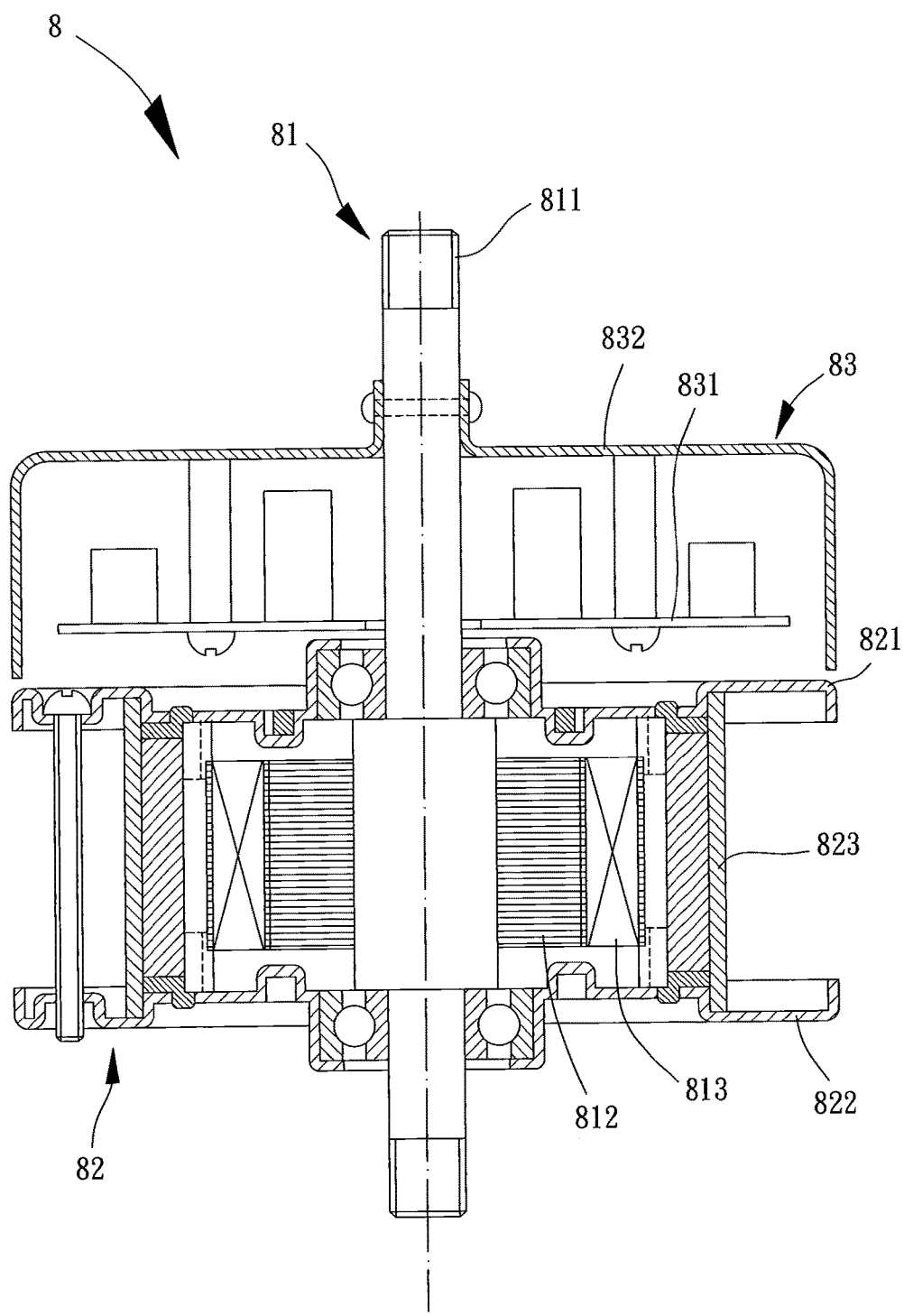
FIG. 1 is a cross sectional view of a conventional ceiling fan motor.
Figure 2:
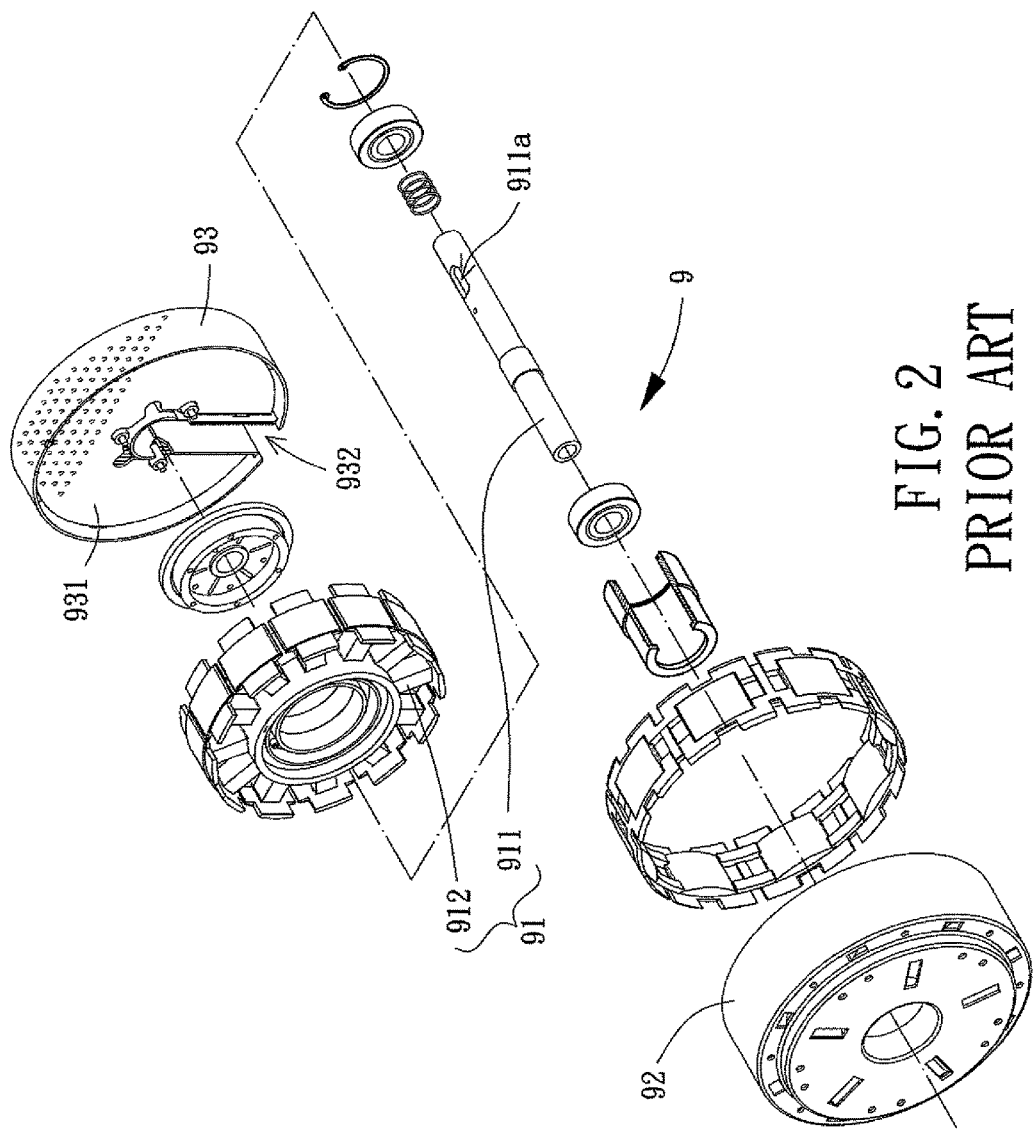
FIG. 2 is an exploded view of another conventional ceiling fan motor.
Figure 3:
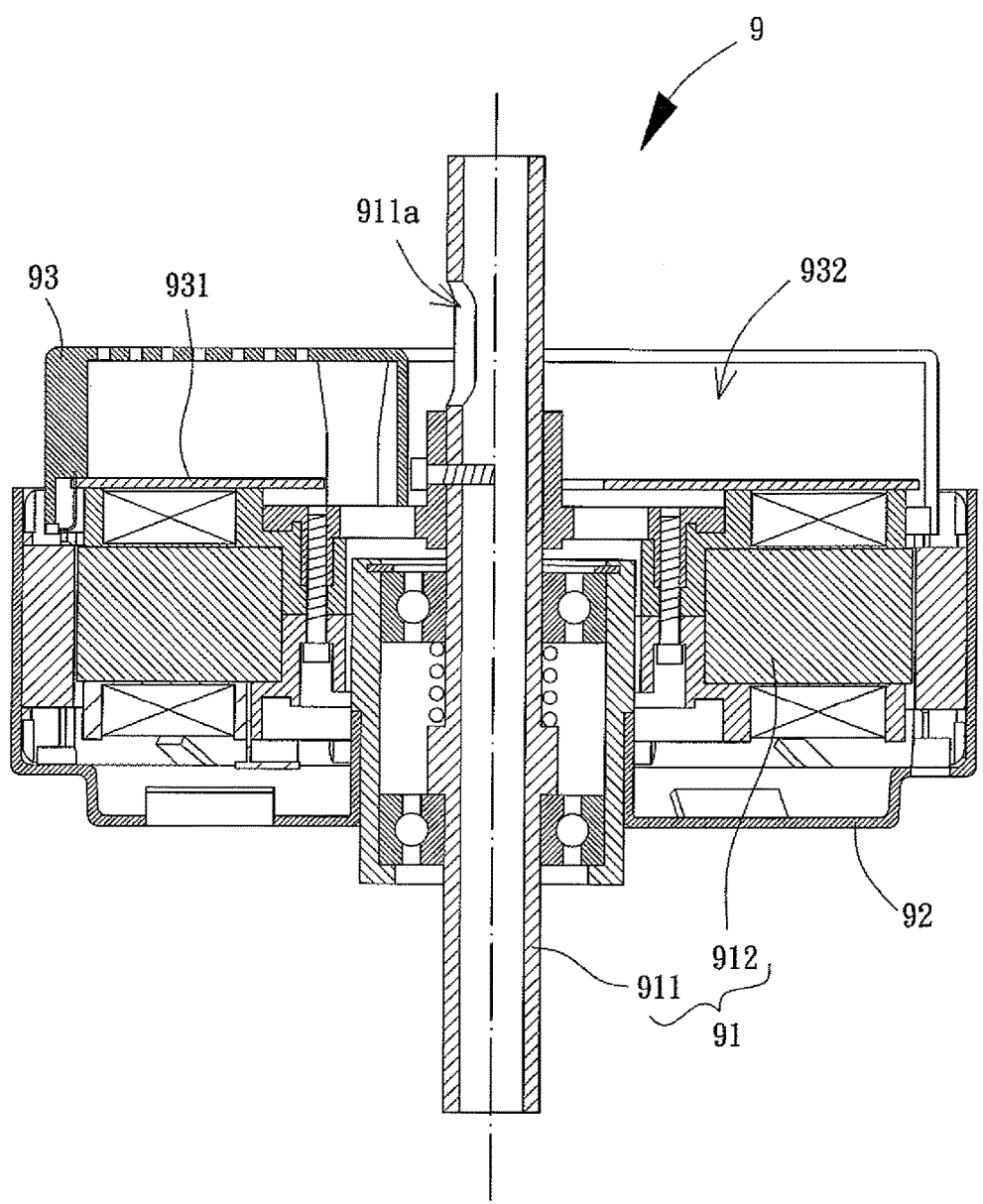
FIG. 3 is a cross sectional view of the conventional ceiling fan motor in FIG. 2.

In the various figures of the drawings, the same numerals designate the same or similar parts. Furthermore, when the terms "first", "second" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 4:
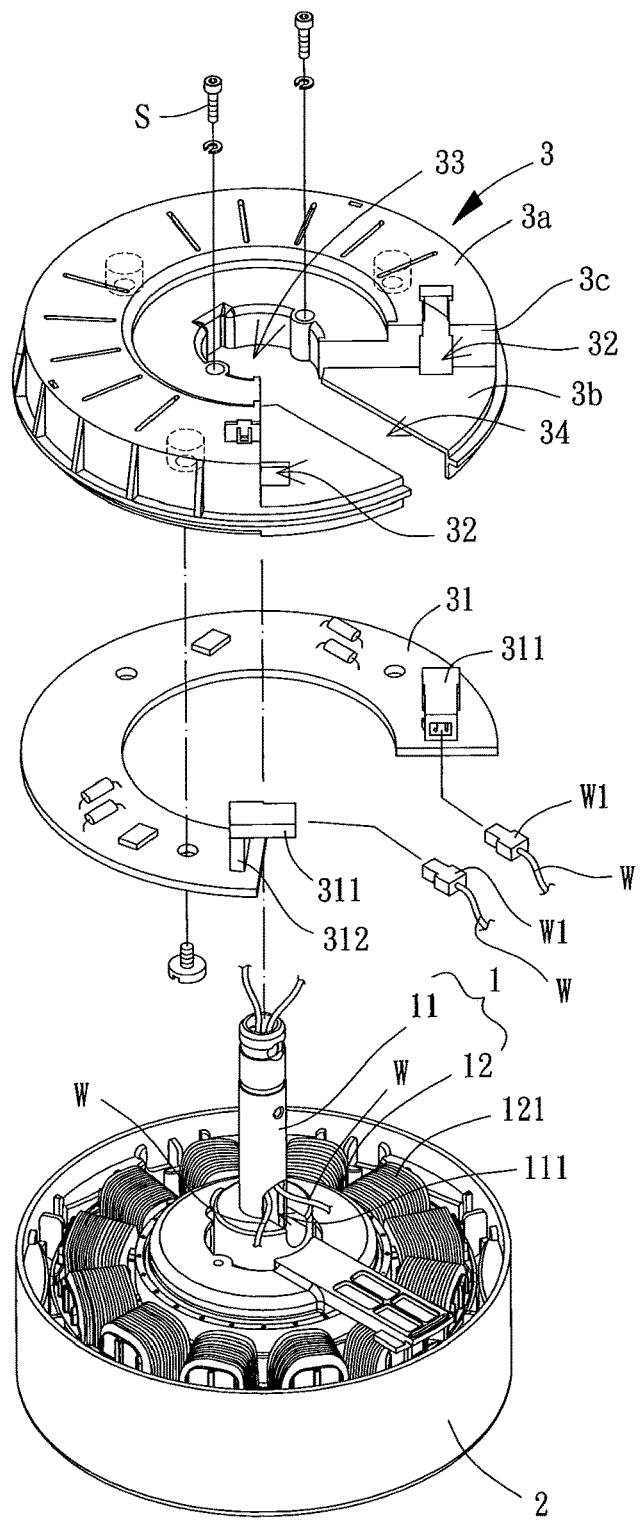
FIG. 4 is an exploded view of a ceiling fan motor according to a first embodiment of the invention.

FIG. 4 shows a ceiling fan motor according to a first embodiment of the invention. The ceiling fan motor includes a stator 1, a rotor 2 and a circuit box 3. The stator 1 includes a shaft 11 and an iron core 12. The iron core 12 is wound with a coil unit 121. The iron core 12 can be directly connected to the shaft 11, or can be indirectly coupled with the shaft 11 via a seat. The rotor 2 is rotatably coupled with the shaft 11.

The circuit box 3 can be attached to or detached from stator 1. In other words, the circuit box 3 may be coupled with the shaft 11 or the iron core 12. For example, in this embodiment, the circuit box 3 is fixed to the iron core 12 via a screwing member "S." Through the screwing member "S", the circuit box 3 can be attached to or detached from stator 1. In addition, the circuit box 3 includes a circuit board 31 that is fixed in the circuit box 3 via screwing, fastening or tenonning.

The circuit board 31 is electrically connected to at least one electrical connection portion 311. Each electrical connection portion 311 may be of various structures with electrical conducting functions, such as an electrical socket, an electrical plug or a wire unit. Furthermore, the circuit board 31 is mounted with a variety of electronic components. Each electrical connection portion 311 may be electrically connected to one or more electronic components of the circuit board 31, as it can be readily appreciated by skilled persons. The circuit box 3 includes at least one opening 32 extending from one surface to another surface thereof. The quantity of the at least one opening 32 may be corresponding to that of the at least one electrical connection portion 311. Each electrical connection portion 311 is exposed through a corresponding opening 32 (in order for the electrical connection portion 311 to be connected to an external accessory or a wire through a corresponding opening 32). In this embodiment, each electrical connection portion 311 is aligned with a corresponding opening 32. In this regard, when there are more than one electrical connection portion 311 and more than one opening 32, the electrical connection portions 311 may be corresponding to the openings 32, respectively. Since each opening 32 extends from one surface to the other surface thereof, each electrical connection portion 311 is exposed through a corresponding opening 32 (in order for the electrical connection portion 311 to be connected to an external accessory or a wire through a corresponding opening 32) under the alignment between the electrical connection portion 311 and the opening 32. In this arrangement, a lead wire "W" can be plugged into the opening 32 and electrically connected to the electrical connection portions 311.

In the embodiment, the electrical connection portion 311 is in the form of an electrical socket, and the lead wire "W" is preferably connected to a plug "W1" fitted to the electrical socket of the electrical connection portion 311. As such, the lead wire "W" is able to electrically connect to the electrical connection portion 311 via the plug "W1." In this arrangement, the lead wire "W" can be easily connected to or removed from the electrical socket of the electrical connection portions 311 via the plug "W1." In another case where the electrical connection portion 311 is in the form of a plug, the lead wire "W" may be connected to a socket fitted to the plug. Thus, the lead wire "W" can be electrically connected to the electrical connection portions 311 via the socket, as it can be readily appreciated by the skilled persons.

Since the electrical connection portion 311 is in the form of an electrical socket in the embodiment, the electrical socket can align with the opening 32 so that the electrical socket can be received in the opening 32. In this case, the electrical socket protrudes out of the circuit box 3. However, in another case, the electrical connection portion 311 may be located in the circuit box 3 and spaced from the opening 32 by a distance. However, no matter in which case, it is simply required to align the electrical connection portion 311 with the opening 32 such that the electrical connection portion 311 can be exposed (in order for the electrical connection portion 311 to be connected to an external accessory or a wire).

The circuit box 3 further includes a shaft hole 33 and an assembly channel 34. The shaft hole 33 may be formed at the center of the circuit box 3 such that the shaft 11 can extend through it. The assembly channel 34 extends in a radial direction perpendicular to the shaft 11, so that the circuit box 3 forms the C-shaped chunk. The shaft 11 can pass the assembly channel 34.

Figure 5:
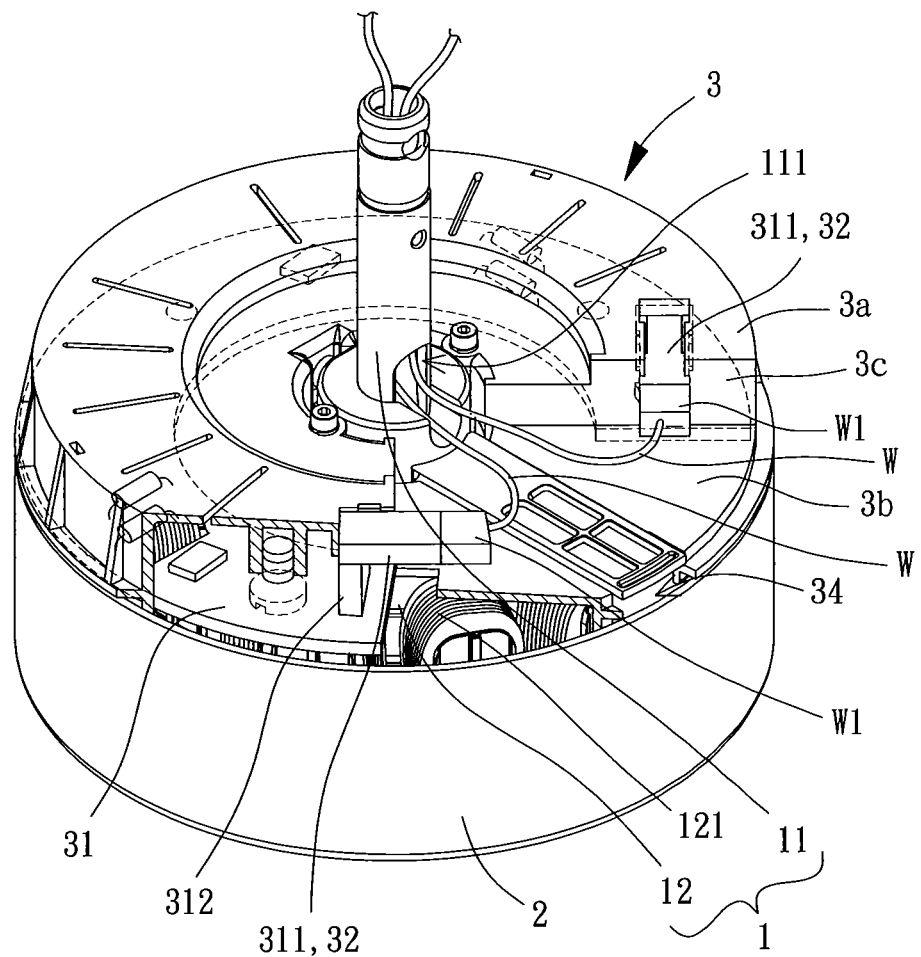
FIG. 5 is a perspective view of the ceiling fan motor after assembly, according to the first embodiment of the invention.

Referring to FIG. 5, when the ceiling fan motor of the first embodiment is in use, the shaft 11 may be fixed to a predetermined location such as the ceiling. The iron core 12 is coupled with the shaft 11, and the rotor 2 is rotatably coupled with the shaft 11. Therefore, the rotor 2 may surround the iron core 12 and may be driven to rotate by the stator 1. The shaft 11 is hollow and accommodates the lead wire "W" (such as a power cord). The lead wire "W" extends out of the shaft 11 through a hole 111 formed on the surface of the shaft 11, so that the lead wire "W" can electrically connect to the electrical connection portion 311. Since the electrical connection portion 311 can be electrically connected to one or more electronic components of the circuit board 31, the lead wire "W" can be electrically connected to the circuit board 31 in the circuit box 3 when electrically connected to the electrical connection portion 311.

In the first embodiment, the rotor 2 is driven to rotate by electricity. Thus, external power must be fed to the circuit board 31. The shaft 11 may receive a lead wire "W" which serves as a power cord. The lead wire "W" includes one end extending into the ceiling through the shaft 11 in order to electrically connect to the external power, as well as another end extending out of the circuit box 3 to electrically connect to the electrical connection portion 311. In this arrangement, the external power may be delivered to the circuit board 31 via the lead wire "W" and the electrical connection portion 311. Thus, it can be known that the quantities of the at least one opening 32 and the at least one electrical connection portion 311 can both be 1.

The circuit board 31 also needs to electrically connect to the coil unit 121. The coil unit 121 can also be electrically connected to the other electrical connection portion 311 via the other lead wire "W", such that the coil unit 121 is able to electrically connect to the circuit board 31. Based on this, the quantities of the openings 32 and the electrical connection portions 311 can both be 2 or more than 2, depending on the requirement of the user.

Figure 6:
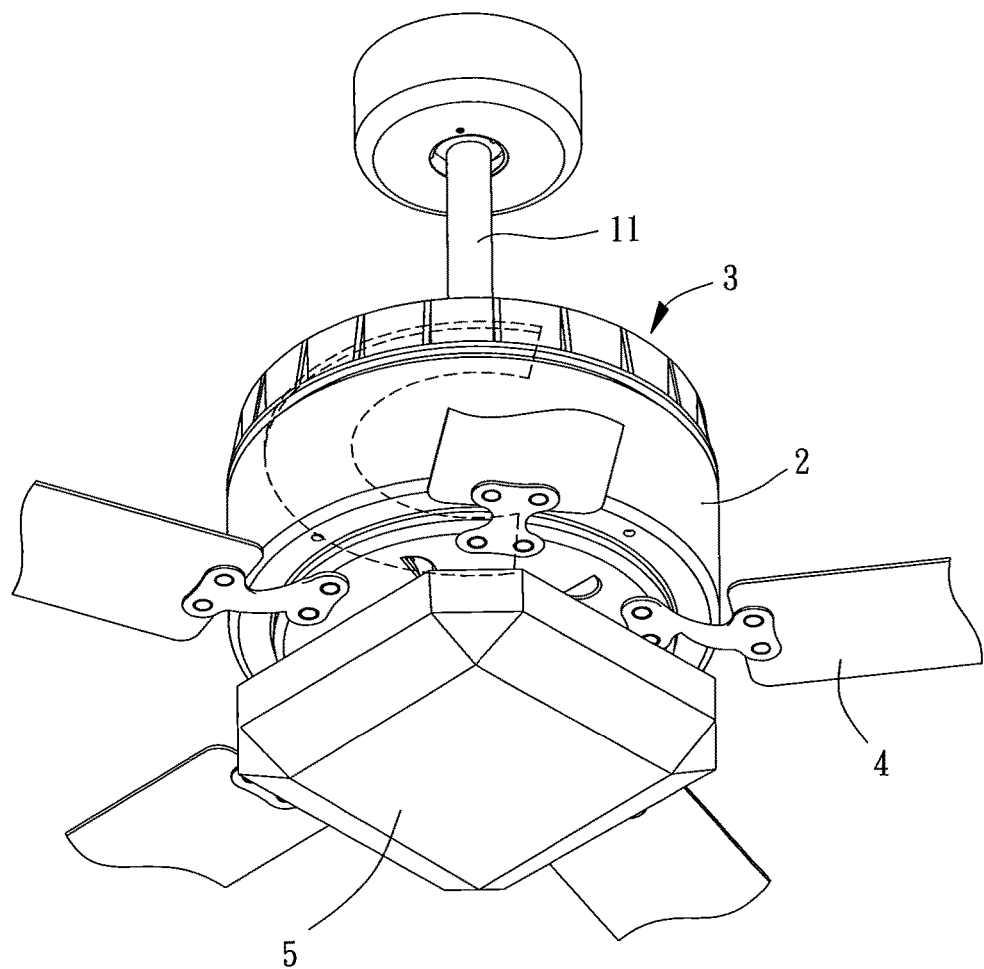
FIG. 6 is a perspective view of a ceiling fan formed by coupling the ceiling fan motor of the first embodiment of the invention with a plurality of blades.

Referring to FIG. 6, a plurality of blades 4 may be coupled with the rotor 2 to form a ceiling fan. The plurality of blades 4 may drive the air currents to generate an air-driving effect. The ceiling fan motor may further comprise a lamp 5. The lamp 5 may be coupled with a certain part of the ceiling fan motor, such as the shaft 11 or the iron core 12 of the stator 1, or the circuit box 3. The maintainer can also connect the lamp 5 to one end of the lead wire "W", and then connect the other end of the lead wire "W" to the electrical connection portion 311 without having to stretch his/her fingers into the circuit box 3 to carry out the connections, such that the lamp 5 can obtain the required power from the circuit board 31. Specifically, if the ceiling fan motor of the first embodiment is a direct current (DC) motor, the circuit board 31 may be mounted with an AC to DC converter that converts the AC voltage of the external power into DC voltage. In this regard, if the lamp 5 is a light-emitting diode (LED) module, the lamp 5 can be electrically connected to the electrical connection portion 311 via the lead wire "W", to receive the required DC voltage of the LED module from the lead wire "W."

Figure 7:
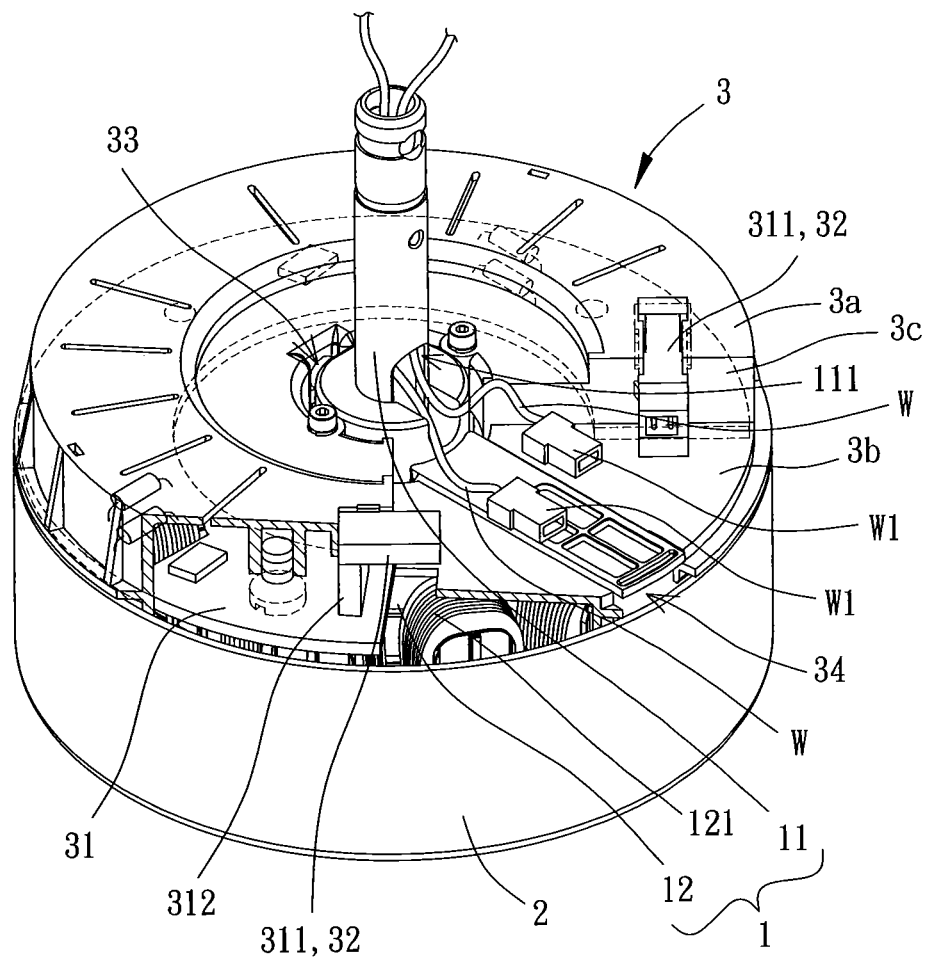
FIG. 7 is a perspective view of the ceiling fan motor where a lead wire is detached from an electrical connection portion of the ceiling fan motor of the first embodiment of the invention.
Figure 8:
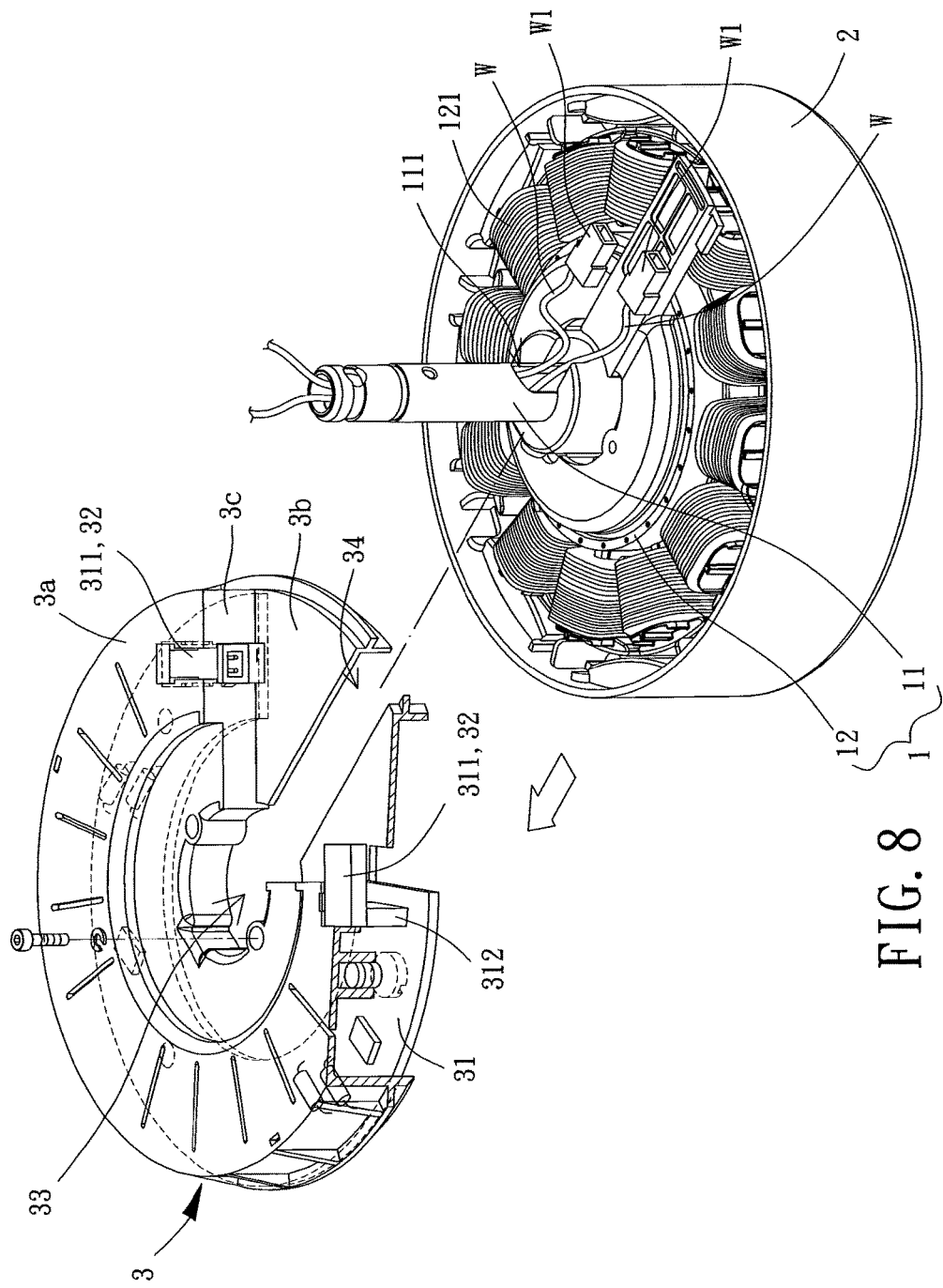
FIG. 8 is a perspective view of the ceiling fan motor where a circuit box is detached from the ceiling fan motor of the first embodiment of the invention.

Referring to FIG. 7, if the circuit board 31 malfunctions after a long term of use of said motor, the maintainer can detach the lead wire "W" from the electrical connection portion 311. Based on this, referring to FIG. 7, it is possible to repair or replace the circuit board 31 by simply separating the circuit box 3 from the stator 1 and pulling the circuit box 3 away from the ceiling fan motor along the assembly channel 34. As compared with the conventional ceiling fan motor 8 where the circuit board 831 can be repaired or replaced only when the entire ceiling fan motor 8 is detached from the ceiling, the circuit board 31 of the first embodiment of the invention can be repaired or replaced by simply detaching the lead wire "W" from the electrical connection portion 311 and separating the circuit box 3 from the stator 1. Thus, utility of the ceiling fan motor of the first embodiment of the invention is improved.

It is noted that in the conventional ceiling fan motor 9, one must stretch his/her fingers into the circuit box 93 and detach the lead wire from the circuit board 931 by fingers before the circuit box 93 can be removed from the ceiling fan motor 9. In contrast, in the first embodiment of the invention, since the maintainer is able to connect the lead wire "W" to the electrical connection portion 311 in the exterior of the circuit box 3 without having to stretch his/her fingers into the circuit box 3 to proceed the operation, the maintainer can also detach the lead wire "W" from the circuit box 3 in the exterior of the circuit box 3 without having to stretch his/her fingers into the circuit box 3 to proceed the detachment, making it more convenient to detach the lead wire "W" from the circuit box 3. As such, detachment of lead wire "W" will be much more convenient, attaining easy repair of the ceiling fan motor and improving utility thereof.

Referring to FIGS. 4 and 5, in the embodiment, the circuit box 3 may include a first face 3a, a second face 3b, and a longitudinally extending face 3c connected between the first face 3a and the second face 3b. The first face 3a has a different height than the second face 3b along an extending direction of the shaft 11. The opening 32 may be arranged on the longitudinally extending face 3c. Thus, when the electrical connection portion 311 is aligned with the opening 32, the electrical connection portion 311 may extend in a plane perpendicular to the extending direction of the shaft 11 (i.e. extending in the radial direction). Therefore, arrangement of the electrical connection portion 311 does not increase the thickness of the circuit box 3. The volume of the ceiling fan motor is effectively reduced.

Figure 9:
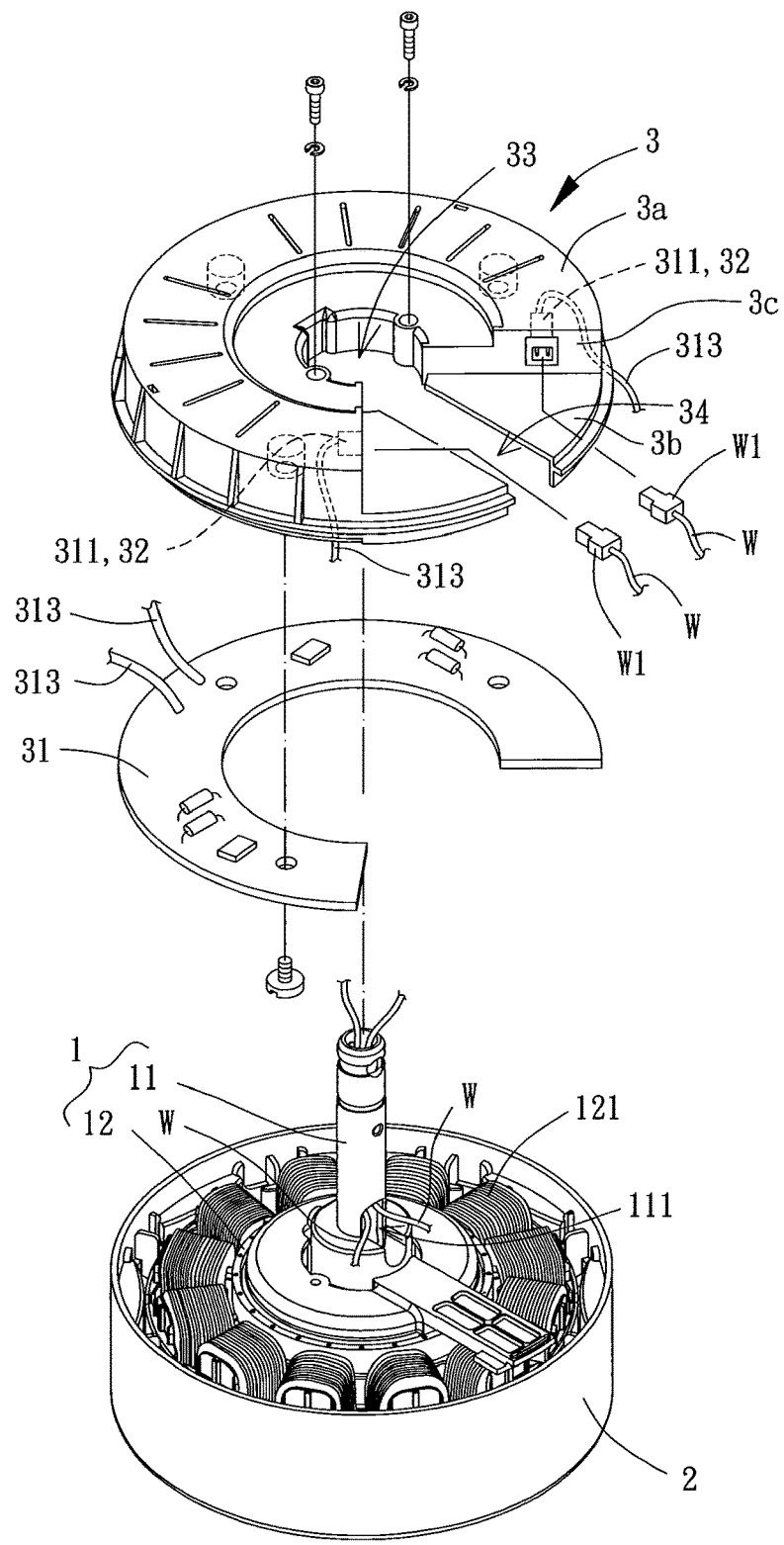
FIG. 9 is an exploded view of another ceiling fan motor according to a second embodiment of the invention.

Besides, referring to FIG. 4, the electrical connection portion 311 is in the form of an electrical socket in the first embodiment, and the electrical connection portion 311 is fixed on the circuit board 31 via a connection member 312. Specifically, the electrical connection portion 311 may be fixed on the circuit board 31 via the connection member 312 to electrically connect the electrical connection portion 311 and the circuit board 31 with each other. However, FIG. 9 shows another ceiling fan motor according to a second embodiment of the invention. In the second embodiment, the electrical connection portion 311 is also in the form of an electrical socket. The second embodiment differs from the first embodiment in that the electrical connection portion 311 is connected to one end of a connection wire 313, and another end of the connection wire 313 is fixed to the circuit board 31 by soldering. Since the lead wire 313 is flexible and its length can be adjusted as desired, the electrical connection portion 311 can be electrically connected to any electronic component of the circuit board 31.

Besides, in the embodiment, the electrical socket of the electrical connection portion 311 can also align with the opening 32 so that the electrical socket can be received in the opening 32. However, since the electrical connection portion 311 is connected to the circuit board 31 via the lead wire 313, the lead wire 313 may extend through the opening 32 and connect to the electrical socket of the electrical connection portion 311. Thus, the electrical socket can be located outside of the circuit box 3. In other words, the electrical connection portion 311 may be electrically connected to the circuit board 31 via a lead wire 313 extending through the opening 32. As such, the electrical connection portion 311 will be located outside of the circuit box 3, such that the electrical connection portion 311 may be exposed via the opening 32 (in order for the electrical connection portion 311 to be connected to an external accessory or a wire via the opening 32).

Figure 10:
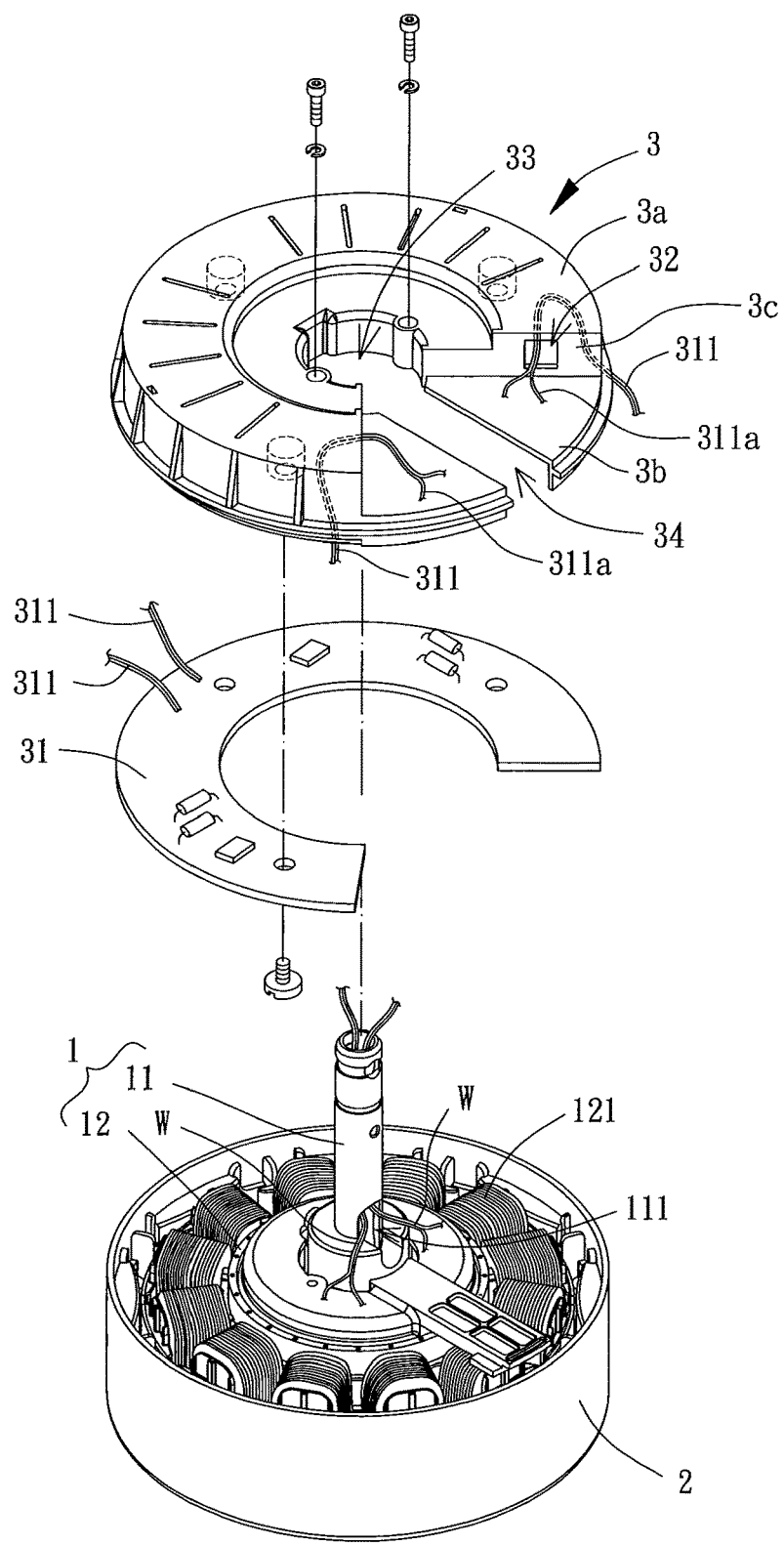
FIG. 10 is an exploded view of a further ceiling fan motor according to a third embodiment of the invention.

FIG. 10 shows a further ceiling fan motor according to a third embodiment of the invention. The electrical connection portion 311 in the embodiment is a wire unit different from the electrical socket in the previous embodiment. The wire unit includes an end 311a and may extend through the opening 32. As such, the end 311a can be located outside of the circuit box 3. In this regard, the maintainer is able to connect the lead wire "W" to the end 311a without having to stretch his/her fingers into the circuit box 3. Therefore, when the electrical connection portion 311 is a wire unit, the electrical connection portion 311 can also be exposed via the opening 32 (in order for the electrical connection portion 311 to be connected to an external accessory or a wire via the opening 32).

The wire unit of the electrical connection portion 311 may be a single lead wire, or may consist of a plurality of lead wires as shown in FIG. 10. Moreover, the wire units of the plurality of electrical connection portions 311 may extend through the same opening 32. In this regard, the quantity of the at least one opening 32 may be less than that of the electrical connection portions 311. Furthermore, since the end 311a is located outside of the circuit box 3, the maintainer is able to connect the lead wire "W" to the end 311a in the exterior of the circuit box 3 without having to stretch his/her fingers into the circuit box 3 to proceed the connection. Then, an insulating tape or an insulating sleeve is wrapped around the interconnected portions of the lead wire "W" and the end 311a for insulating purposes.

Based on the above structures, the ceiling fan motors of the invention have the following characteristics. The circuit box 3 includes at least one opening 32 extending through one surface to another surface thereof, as well as an assembly channel 34 extending in a radial direction of the shaft 11. The circuit box 3 includes a circuit board 31 electrically connected to at least one electrical connection portion 311. By exposing the electrical connection portion 311 through the opening 32, the maintainer is able to connect the lead wire "W" to the electrical connection portion 311 in the exterior of the circuit box 3 without having to stretch his/her fingers into the circuit box 3 to proceed the operation. Advantageously, when the circuit board 31 malfunctions, the maintainer is able to simply detach the lead wire "W" from the electrical connection portion 311 in the exterior of the circuit box 3 without having to stretch his/her fingers into the circuit box 3 to proceed the operation. Then, the circuit box 3 can be pulled away from the ceiling fan motor along the assembly channel 34 for repair or replacement purposes, advantageously improving the utility of the ceiling fan motor.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A ceiling fan motor comprising:
a stator comprising a shaft and an iron core;
a rotor rotatably coupled with the shaft; and
a circuit box configured to be attached to or detached from the stator and comprising a circuit board and an opening, wherein the circuit board is electrically connected to an electrical connection portion, wherein the opening extends through one surface to another surface of the circuit box, wherein the electrical connection portion is configured to be connected to a wire via the opening, and wherein the wire is a power cord connected to an external power for supplying power.

2. The ceiling fan motor as claimed in claim 1, wherein the electrical connection portion is an electrical socket or an electrical plug.

3. The ceiling fan motor as claimed in claim 2, wherein the electrical connection portion is fixed on the circuit board via a connection member.

4. The ceiling fan motor as claimed in claim 2, wherein the electrical connection portion is connected to one end of a connection wire, and another end of the connection wire is fixed to the circuit board by soldering.

5. The ceiling fan motor as claimed in claim 3, wherein the electrical connection portion is aligned with the opening.

6. The ceiling fan motor as claimed in claim 5, wherein the electrical connection portion is partially received in the circuit box while extending out of the circuit box through the opening.

7. The ceiling fan motor as claimed in claim 4, wherein the connection wire extends through the opening and is connected to the electrical connection portion, and wherein the electrical connection portion is partially received in the circuit box while extending out of the circuit box.

8. The ceiling fan motor as claimed in claim 1, wherein the circuit box further comprises an assembly channel extending in a radial direction perpendicular to the shaft, and wherein the shaft is capable of extending through the assembly channel.

9. The ceiling fan motor as claimed in claim 1, wherein the electrical connection portion is in the form of a wire unit having an end, wherein the wire unit is partially received in the circuit box while the end of the wire unit extends out of the circuit box through the opening.

10. The ceiling fan motor as claimed in claim 1, wherein the circuit box further comprises a shaft hole, and wherein the shaft extends in the shaft hole.

11. The ceiling fan motor as claimed in claim 1, wherein the circuit board is mounted with a plurality of electronic components, and wherein the electrical connection portion is electrically connected one of the plurality of electronic components.

12. The ceiling fan motor as claimed in claim 1, wherein the circuit box comprises a first face, a second face opposite to the first face in an extending direction of the shaft, and a longitudinally extending face extending from the first face to the second face in the extending direction of the shaft, wherein the first face has a different height than the second face in the extending direction of the shaft, and wherein the opening is arranged on the longitudinally extending face.

13. The ceiling fan motor as claimed in claim 1, wherein the shaft is hollow and receives a lead wire, wherein the lead wire extends out of the shaft through a hole formed on a surface of the shaft and electrically connects to the electrical connection portion in an exterior of the circuit box.

14. A ceiling fan motor comprising:
a stator comprising a shaft and an iron core;
a rotor rotatably coupled with the shaft; and
a circuit box configured to be attached to or detached from the stator and comprising a circuit board and a plurality of openings, wherein the circuit board is electrically connected to a plurality of electrical connection portions, wherein each of the plurality of openings extends through one surface to another surface of the circuit box, and wherein the plurality of electrical connection portions is configured to be connected to a wire via the plurality of openings, wherein the quantity of the plurality of openings corresponds to the quantity of the plurality of electrical connection portions, and wherein the wire is a power cord connected to an external power for supplying power.

15. The ceiling fan motor as claimed in claim 14, wherein each of the plurality of electrical connection portions is configured to be connected to the wire via a respective one of the plurality of openings.

16. The ceiling fan motor as claimed in claim 14, wherein the shaft is hollow and receives a lead wire, wherein the lead wire extends out of the shaft through a hole formed on a surface of the shaft and electrically connects to one of the plurality of electrical connection portions in an exterior of the circuit box.

17. The ceiling fan motor as claimed in claim 16, wherein the lead wire is electrically connected to an external power.

18. The ceiling fan motor as claimed in claim 16, wherein the iron core is wound with a coil unit, and wherein the coil unit is connected to another one of the plurality of electrical connection portions via another lead wire in the exterior of the circuit box.

19. The ceiling fan motor as claimed in claim 16, further comprising a lamp connected to the one of the plurality of electrical connection portions in the exterior of the circuit box via another lead wire.

20. The ceiling fan motor as claimed in claim 14, wherein the circuit board is mounted with a plurality of electronic components, and wherein the plurality of electrical connection portions is electrically connected one of the plurality of electronic components.

21. The ceiling fan motor as claimed in claim 14, wherein the circuit box comprises a first face, a second face opposite to the first face in an extending direction of the shaft, and a longitudinally extending face extending from the first face to the second face in the extending direction of the shaft, wherein the first face has a different height than the second face in the extending direction of the shaft, and wherein the plurality of openings is arranged on the longitudinally extending face.

22. The ceiling fan motor as claimed in claim 14, wherein the circuit box comprises a shaft hole, and wherein the shaft extends in the shaft hole.

* * * * *